US007996142B2

(12) United States Patent
Sihler et al.

(10) Patent No.: US 7,996,142 B2
(45) Date of Patent: Aug. 9, 2011

(54) SYSTEM FOR CLOSED-LOOP CONTROL OF COMBUSTION IN ENGINES

(75) Inventors: Christof Martin Sihler, Hallbergmoos (DE); Georgios Bikas, Freising (DE); Herbert Kopecek, Hallbergmoos (DE)

(73) Assignee: General Electric Company, Niskayuna, NY (US)

(*) Notice: Subject to any disclaimer, the term of this patent is extended or adjusted under 35 U.S.C. 154(b) by 88 days.

(21) Appl. No.: 12/270,878

(22) Filed: Nov. 14, 2008

(65) Prior Publication Data

US 2010/0122688 A1 May 20, 2010

(51) Int. Cl.

| | |
|---|---|
| ***F02D 41/00*** | (2006.01) |
| ***G06F 19/00*** | (2006.01) |
| ***G01M 15/00*** | (2006.01) |
| ***F02P 5/15*** | (2006.01) |

(52) U.S. Cl. .................... 701/103; 701/111; 123/406.29; 73/114.11

(58) Field of Classification Search .......... 701/101–105, 701/108, 111, 115; 123/406.23, 436, 478, 123/480, 406.24, 406.26, 406.29, 435, 568.11, 123/568.12, 90.38, 41.31, 195 C; 73/114.11, 73/114.15, 862.333, 114.02, 114.04, 114.08, 73/114.13, 862.331–862.336; 74/114.02, 74/114.04, 114.08, 114.13, 862.331–862.336; 165/103

See application file for complete search history.

(56) References Cited

U.S. PATENT DOCUMENTS

| | | | | |
|---|---|---|---|---|
| 4,760,745 | A * | 8/1988 | Garshelis | 73/862.333 |
| 4,882,936 | A * | 11/1989 | Garshelis | 73/862.333 |
| 4,896,544 | A * | 1/1990 | Garshelis | 73/862.333 |
| 5,052,232 | A * | 10/1991 | Garshelis | 73/862.336 |
| 5,493,921 | A | 2/1996 | Alasafi et al. | |
| 5,503,241 | A * | 4/1996 | Hiraiwa | 180/446 |
| 5,585,574 | A * | 12/1996 | Sugihara et al. | 73/862.334 |
| 5,671,713 | A * | 9/1997 | Yamaguchi et al. | 123/308 |
| 5,675,094 | A | 10/1997 | Klauber et al. | |
| 6,487,925 | B2 * | 12/2002 | Fischer et al. | 74/337 |
| 6,817,253 | B2 * | 11/2004 | Gandrud | 73/862.23 |
| 6,929,518 | B1 * | 8/2005 | Sawyer et al. | 440/75 |
| 7,131,339 | B2 | 11/2006 | Kwun et al. | |
| 7,243,557 | B2 | 7/2007 | May | |
| 7,389,702 | B2 | 6/2008 | Ouyang et al. | |
| 7,677,115 | B2 * | 3/2010 | Fukuda et al. | 73/862.335 |
| 2003/0127278 | A1 * | 7/2003 | Matsuoka et al. | 180/446 |
| 2005/0216165 | A1 * | 9/2005 | Ito | 701/84 |
| 2007/0068726 | A1 * | 3/2007 | Shimizu | 180/444 |

(Continued)

OTHER PUBLICATIONS

M.F.S. Ventim Neves; "A Contactless Torque Sensor Based on the Magnetostriction Property of Amorphous Iron"; 0/7803-3019-6/96/ 1996IEEE; pp. 661-664.

(Continued)

*Primary Examiner* — Willis R Wolfe, Jr.
*Assistant Examiner* — Johnny H Hoang
(74) *Attorney, Agent, or Firm* — Ann M. Agosti

(57) ABSTRACT

A combustion control system includes a magnetic torque sensor disposed between an engine and a load. The magnetic torque sensor is configured to directly measure engine torque and output a torque signal indicative of the engine torque. A control unit is communicatively coupled to the magnetic torque sensor. The control unit is configured to receive the torque signal and determine one or more combustion parameters based on the torque signal. The control unit is also configured to control one or more manipulating parameters of the engine based on the one or more combustion parameters so as to control combustion in the engine.

21 Claims, 5 Drawing Sheets

U.S. PATENT DOCUMENTS

2007/0240522 A1 * 10/2007 Shimizu et al. .......... 73/862.331

OTHER PUBLICATIONS

"A Contactless Torque Sensor for Online Monitoring of Torsional Oscillations"; Fraunhofer ITWM2007; Available from <http://www.itwm.fhg.de/as/asproducts/torsion/Flyer__Sensor__ITWM__en.pdf>; 4Pages.

"Contactless Torque Sensor", Cedrat Technologies,15 Chemin de Malacher—Inovallée38246 Meylan Cedex—France; actuator@cedrat.com; 2 Pages.

* cited by examiner

SYSTEM FOR CLOSED-LOOP CONTROL OF COMBUSTION IN ENGINES

BACKGROUND

The invention relates generally to combustion engines, and more particularly, to a system for closed-loop control of combustion in engines, for example, gas engines.

In an engine, for example gas engine, a mixture of gaseous fuel and air are compressed within each of the engine cylinders to create an air-fuel mixture that ignites due to the heat and pressure of compression (self or auto ignition relates to diesel engine) or an ignition source, for example spark plug in gas engines. The air-fuel mixture is exploded via the use of an ignition plug to generate an output power. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increases in various exhaust emissions. Vehicle exhaust emissions include pollutants such as carbon monoxide (CO), nitrogen oxides (NOx), sulfur oxides (SOx), particulate matter (PM), and smoke generated due to incomplete combustion of fuel within the combustion chamber. The amount of these pollutants varies depending on the fuel-air mixture, compression ratio, injection timing, ambient conditions, engine output power, and so forth.

Engine performance may be improved by controlling combustion within each of the engine cylinders. The factors affecting engine performance may include reduction in coefficient of variance between different cylinders, operating engine closer to knock limits, improved ignition control, changes in gas quality, misfired cylinder, or the like. One or more parameters related to the engine would need to be monitored to control the combustion within each cylinder of the engine. Conventionally, piezoelectric pressure transducers, ion current sensors, or optical detectors are used to monitor one or more parameters related to the engine. However, these conventional sensors are inaccurate, lack in reliability, and are expensive to be used. Another issue with the conventional approach is the requirement of large number of sensors. Hence the complexity of the control system is also increased. Also, none of the conventional approaches provide a feedback of an engine power output to a control system.

There is a need for a suitable control unit that can reliably detect one or more combustion parameters related to an engine and control combustion within each cylinder of the engine so as to improve engine performance.

BRIEF DESCRIPTION

In accordance with an exemplary embodiment of the present invention, a combustion control system for a combustion engine system is disclosed. The combustion control system includes a magnetic torque sensor disposed between an engine and a load. The magnetic torque sensor is configured to directly measure engine torque and output a torque signal indicative of the engine torque. A control unit is communicatively coupled to the magnetic torque sensor. The control unit is configured to receive the torque signal and determine one or more combustion parameters based on the torque signal. The control unit is also configured to control one or more manipulating parameters of the engine based on the one or more combustion parameters so as to control combustion in the engine.

In accordance with another exemplary embodiment of the present invention, a combustion engine system is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a combustion control system for a combustion engine system. The combustion control system includes a magnetic torque sensor disposed between an engine and a load. The magnetic torque sensor is configured to directly measure engine torque and output a torque signal indicative of the engine torque. A control unit is communicatively coupled to the magnetic torque sensor. The control unit is configured to receive the torque signal and determine one or more combustion parameters based on the torque signal. The control unit is configured to further control one or more manipulating parameters of the engine based on the one or more combustion parameters so as to control combustion in the engine. In certain embodiments, a contact less magnetic torque sensor is disposed around a crankshaft between the engine and the load. The magnetic torque sensor may be a magnetoelastic torque sensor or a magnetostrictive torque sensor. The control system is used for individual cylinder diagnostics and closed loop control of combustion in large reciprocating engines. A single sensor is used to achieve high time resolution signals from the combustion event in each engine cylinder. The sensor provides torque signal as a function of time, which can be used to analyze pressure rise during combustion event, for gaining information on the combustion process including timing, intensity, stability, or the like. This information can then be used to calculate optimum values for manipulating variables including throttle valve position, boost pressure, air-fuel ratio, ignition timing, fuel injection timing, fuel amount, valve timing, or the like. The control system provides a reliable closed-loop control of combustion within each cylinder of the engine.

Figure 1:
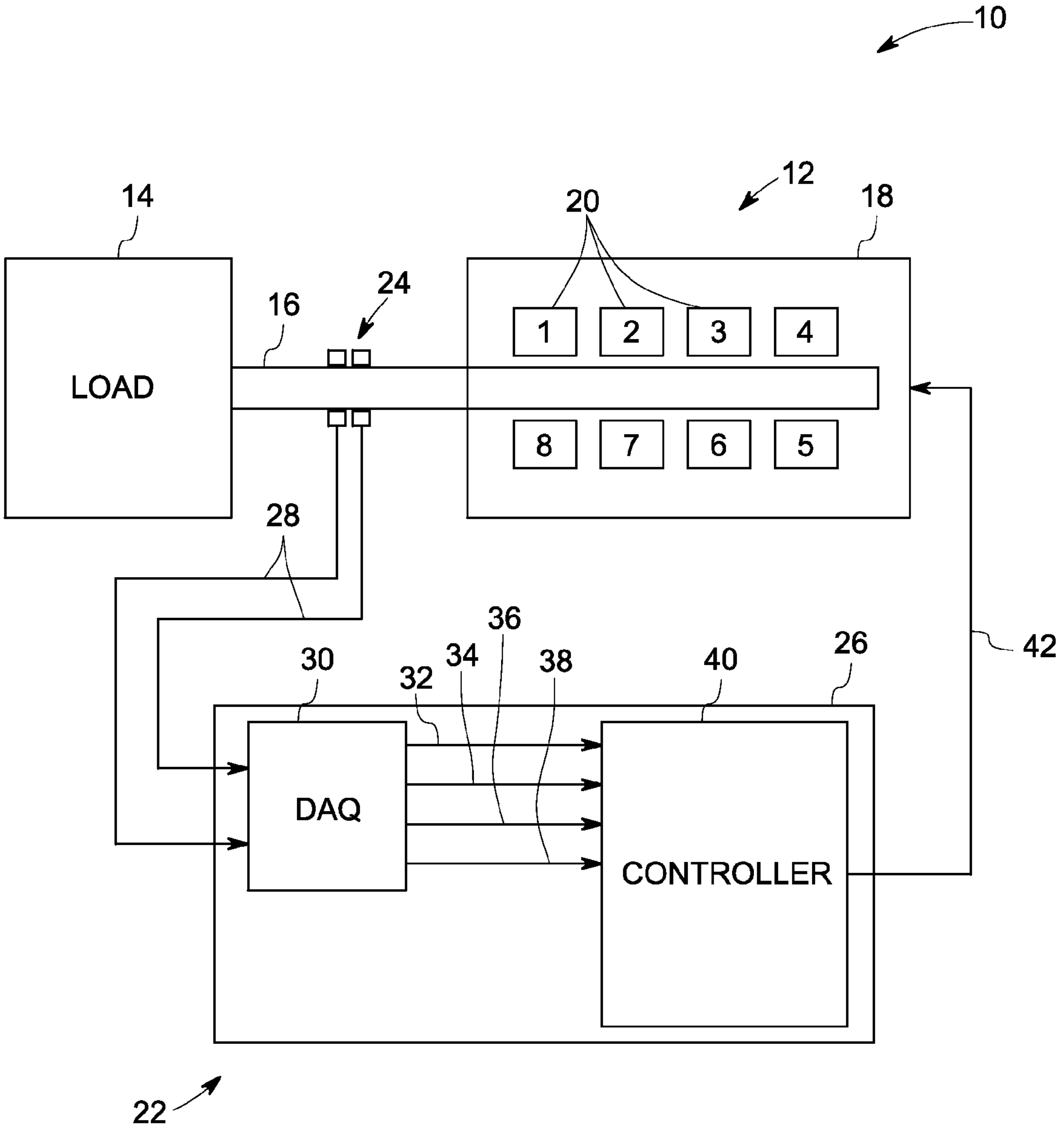
FIG. 1 is a diagrammatical view of a combustion engine system for example, gas engine system having a combustion control system in accordance with an exemplary embodiment of the present invention.

Referring to FIG. 1, a combustion engine system 10 in accordance with an exemplary embodiment of the present invention is illustrated. The system 10 includes an engine 12 coupled to a load 14 via a crankshaft 16. In one embodiment, the engine 12 is a gas engine. In other embodiments, the engine 12 may be an Otto engine or other stationary engines. The engine 12 includes a cylinder block 18 having a plurality of engine cylinders 20. Even though 8 engine cylinders 20 are illustrated, the number of cylinders may vary in other embodiments depending on the application. The load 14 may include a generator, mechanical drive unit, or the like. The system 10 also includes a combustion control system 22 configured to control combustion within each cylinder 20 of the engine 12.

The system 22 includes a magnetic torque sensor 24 and a control unit 26. The magnetic torque sensor 24 is disposed between the engine 12 and the load 14. In the illustrated embodiment, the magnetic torque sensor 24 is disposed around the crankshaft 16. The magnetic torque sensor is 24 is configured to directly measure engine torque and output a torque signal 28 indicative of the engine torque. The magnetic torque sensor 24 may be a magnetoelastic sensor or a magnetostrictive sensor. The control unit 26 is communicatively coupled to the magnetic torque sensor 24. The control unit 26 is configured to receive the torque signal 28 and determine one or more combustion parameters based on the torque signal and further controls one or more manipulating parameters of the engine 12 based on the one or more combustion parameters so as to control combustion within each cylinder 20 of the engine 12. Furthermore, the torque signal 28 can be either used to monitor engine power output or manipulate engine parameters for an accurate control of the power output. In conventional systems, engine parameters are manipulated accordingly to control a power output. However, in such systems there is no validation done to check whether the power output is near to a set point.

In one embodiment, the control unit 26 includes a data acquisition unit (DAQ) 30 configured to receive the torque signal 28 and output a plurality of signals 32, 34, 36, 38 corresponding to a plurality of combustion parameters based on the torque signal 28. In the illustrated embodiment, the signals 32, 34, 36, and 38 correspond to engine cylinder knock, misfired cylinder, combustion timing; torque oscillations, or combinations thereof. The control unit 26 also includes a controller 40 configured to receive the signals 32, 34, 36, 38 corresponding to the plurality of combustion parameters and output one or more signals 42 so as to control one or more manipulating parameters for controlling combustion within each cylinder 20 of the engine 12. In some embodiments, the controller 40 may additionally receive input signals corresponding to engine speed, power, and emission levels for controlling combustion within the engine 12. The manipulating parameters may include a throttle valve position, boost pressure, air-fuel ratio, fuel ignition timing, fuel injection timing, fuel amount; exhaust gas recirculation, or combinations thereof. One or more corresponding control devices of the engine 12 may be controlled so as to control the manipulating parameters described herein.

Figure 2:
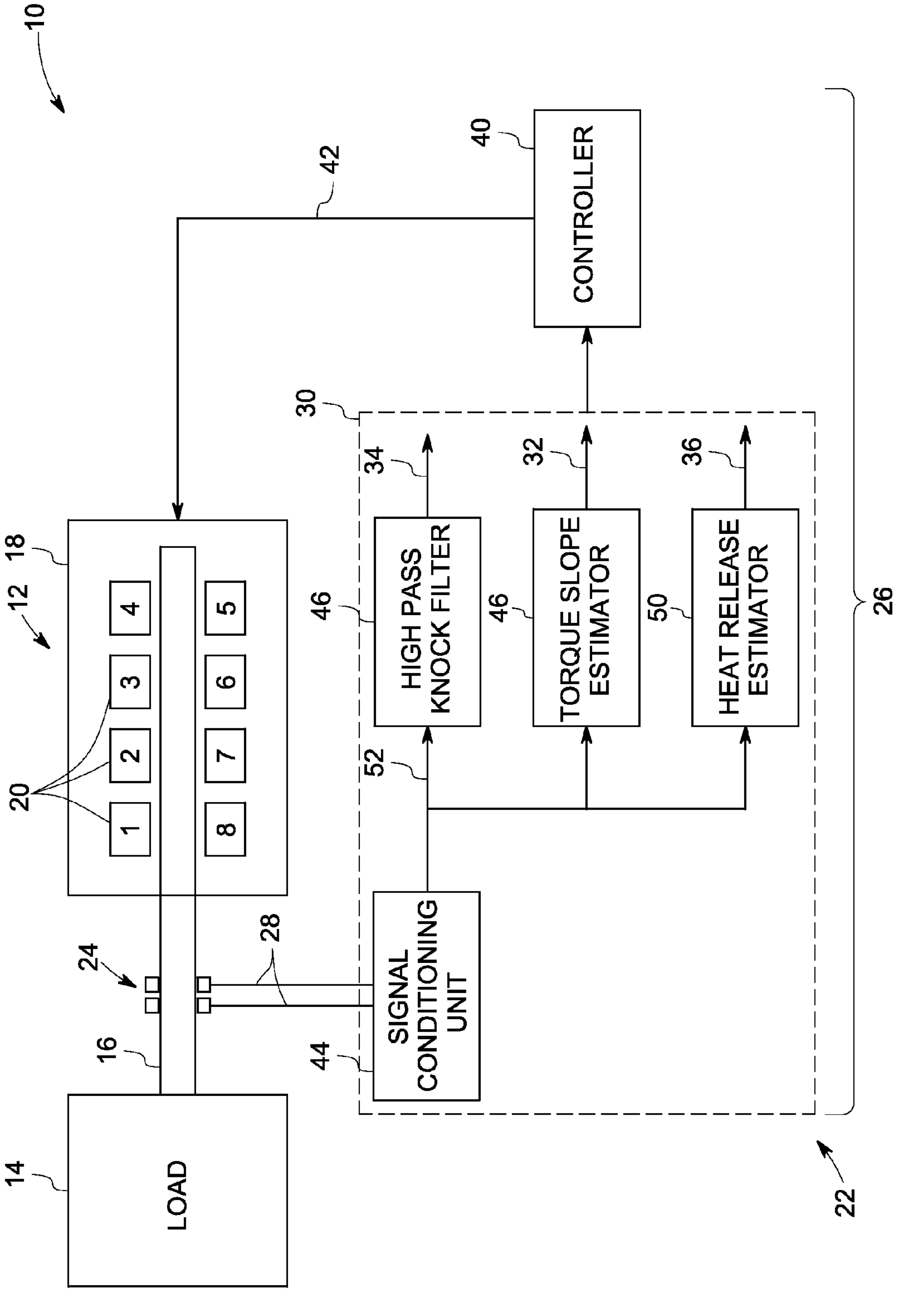
FIG. 2 is a diagrammatical view of a combustion engine system having a combustion control system comprising a data acquisition unit and a controller in accordance with an exemplary embodiment of the present invention.

Referring to FIG. 2, a combustion engine system 10 in accordance with an exemplary embodiment of the present invention is illustrated. As discussed previously, the system 10 includes the engine 12 coupled to the load 14 via the crankshaft 16. The system 10 also includes the combustion control system 22 configured to control combustion within each cylinder 20 of the engine 12. The magnetic torque sensor 24 is disposed between the engine 12 and the load 14. The system 22 includes the control unit 26 communicatively coupled to the magnetic torque sensor 24. The control unit 26 is configured to receive the torque signal 28 and determine one or more combustion parameters based on the torque signal and further control one or more manipulating parameters of the engine 12 based on the one or more combustion parameters so as to control combustion within each cylinder 20 of the engine 12.

In the illustrated embodiment, the data acquisition unit (DAQ) 30 of the control unit 26 includes a signal conditioning unit 44, a high pass filter 46, torque slope estimator 48, and a heat release estimator 50. The signal conditioning unit 44 receives the torque signal 28 and outputs a time-resolved conditioned torque signal 52 suitable for estimating the combustion parameters. The high pass knock filter 46 is configured to receive the conditioned torque signal 52 and provide a cylinder knock signal 34 in kilohertz (kHz) based on the conditioned signal 52. The torque slope estimator 48 is configured to receive the conditioned torque signal 52 and provide a misfired cylinder signal 32. The heat release estimator 50 is configured to receive the conditioned torque signal 52 and provide a combustion timing signal 36. It should be noted herein that the architecture of the illustrated data acquisition unit 30 is an exemplary embodiment and should not be construed in any way as limiting the scope. The controller 40 is configured to receive the signals 32, 34, 36 and output one or more signals 42 so as to control one or more manipulating parameters for controlling combustion within each cylinder 20 of the engine 12.

In the embodiments discussed herein, only a single torque sensor is used to obtain real-time measured information related to combustion in each cylinder 20. In other words, combustion parameters can be detected for each cylinder individually with high time resolution (for example, 20 kHz) by using only one magnetic torque sensor. The magnetic sensor system 24 does not contact any rotating components of the engine and is designed to deliver high quality torque output signals without extensive signal processing. The control system 22 individually controls gas exchange, ignition and combustion in each cylinder 20. As a result, coefficient of variance is reduced, and the engine is operated closer to knock limit. The control system 22 facilitates improved transient behavior of the engine with changes in gas quality, air-fuel mixture homogeneity, igniter performance, and load conditions such as mechanical drive, mini grid, or the like.

In the discussed embodiments, cylinder-to-cylinder variability (variation in cylinder parameters) is detected with high time resolution by using only one magnetic torque sensor. Cylinder-to-cylinder variability may be in terms of power, air-fuel ratio, or the like. In one embodiments, cylinder-to-cylinder deviation and coefficient of variance are reduced with improve gas exchange and turbocharger performance by individually controlling fuel injection in each cylinder 20.

Figure 3:
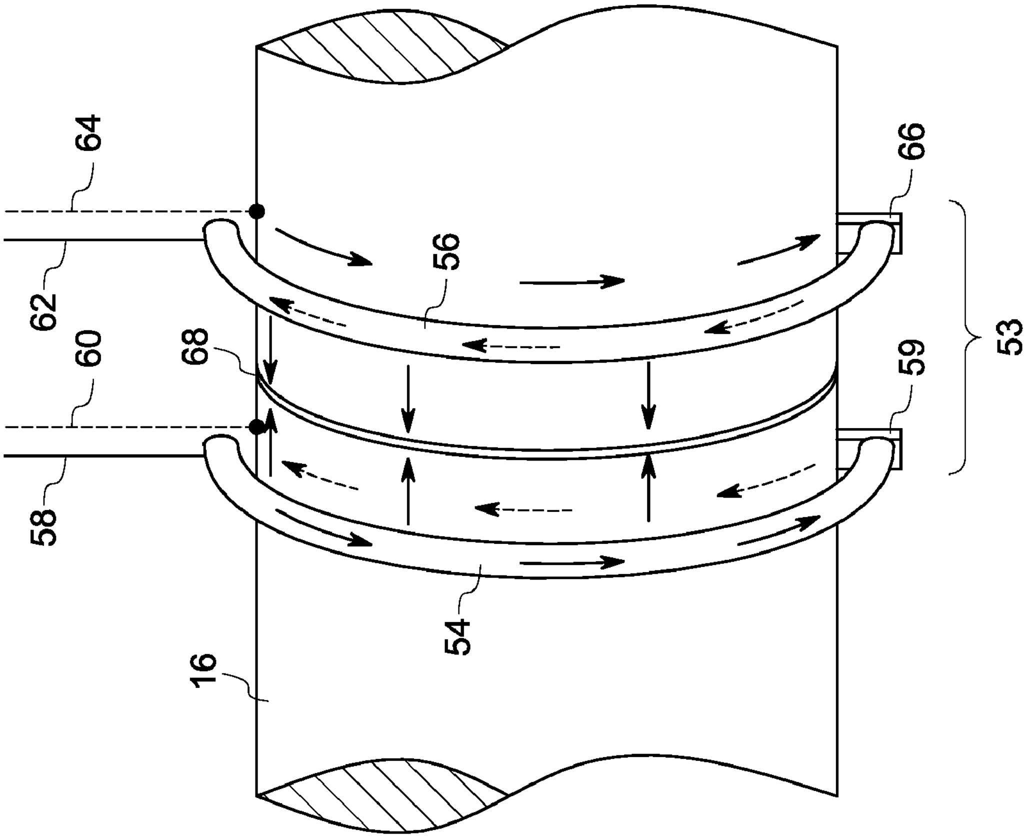
FIG. 3 is a diagrammatical view of an arrangement for partial magnetic encoding of a shaft, in order to detect shaft torque in accordance with an exemplary embodiment of the present invention.

Referring to FIG. 3, a magnetic encoding tool 53 for creating a magnetostrictive torque sensor is illustrated disposed around the crankshaft 16. Magnetostrictive measurement methods make use of the phenomenon that material changes dimensions upon being magnetized. The accuracy of magnetostrictive measurement systems can be improved by combining the magnetostrictive effect with a magnetic encoding of the shaft 16 or the encoding section applied to the shaft 16. In such sensor designs, the alignment of the magnetic domains in the ferromagnetic material imparts some change in the material dimensions along a magnetic axis. The inverse effect is the change of magnetization of a ferromagnetic material due to mechanical stress. The magnetic encoding essentially converts the shaft 16 into a component of the sensing system. When a mechanical torque is applied to the shaft 16, a torque-dependent magnetic field is measurable close to the encoded region of the shaft 16.

In the illustrated embodiment, enhanced encoding systems for shafts and measuring properties thereof is achieved by sectional encoding where encoded zones or magnetic channels are generated in axial or circumferential directions of the shaft 16. For large diameter shafts, it is beneficial to employ this magnetic encoding where relevant flux densities can be achieved with lower encoding currents.

The shaft 16 can be a ferromagnetic material or may have at least a section of ferromagnetic material affixed to the shaft 16. In the illustrated embodiment, two arc segments 54, 56 are disposed about a segment of the shaft 16. One conducting arc segment 54 is coupled to a positive polarity encoding source (not shown) via a positive end 58 such that the encoding currents travel along from the positive end and along the arc segment 54. In this embodiment, another end of the conducting arc segment 54 is coupled to the shaft 16 via an electrode 725. The encoding current pulse travels along the arc segment 54 and the return current travels along the shaft 16 to a return electrode via a return end 60 that is electrically coupled to the encoding source (not shown).

The other conducting arc segment 56 is coupled via a return end 62 to the encoding source (not shown). The encoding signals travel from the encoding source (not shown) to the positive end 64 via an electrode in contact with the shaft 16, then along the surface of the shaft 16 and through an electrode 66. The encoding currents travel along the arc segment 56 and return via the return end 62 to the encoding source (not shown). Once again, this encoding generates sectional magnetic regions about the circumference of the shaft 16. The combination of the pair of conducting arc segments 54, 56 that create the polarized magnetic regions also creates the domain boundary 68 therebetween. In this embodiment, there are two polarized regions orientated along an axial direction of the shaft 16. The magnetic field measurement is simpler since the shaft 16 rotates and there is a greater length of sensing area in the circumferential direction. It should be readily apparent that while depicted as an arc segment of about a semi-circle, the arc segments can be a small portion of the shaft 16 or larger portions of the circular circumference. Furthermore, while shown as being circumferential, the encoded channels can be along any direction of the shaft 16 such as axially or diagonally. An advantage of the circumferential encoding method as shown in FIG. 3 is that the magnetic measurement is not affected as the shaft rotates (magnetic field output not dependent on the rotational position of the shaft in the encoded section). This provides torque output signals with high time resolution.

In one embodiment, electrical currents travel through the shaft 16 such that magnetized regions are generated on the shaft 16. One of the features of this encoding system is the ability to magnetically encode channels or magnetic polarization regions in the shaft 16. The current penetration, namely the depth of the current density in the shaft, is controlled by the duration of the current pulse in one embodiment. According to a simple encoding approach, a magnetized section is encoded one circuit at a time. To avoid that the influence of sequential magnetization of one section by the next magnetization, another encoding embodiment involves applying the same current amplitude to all the conducting members and encoding all the sections at once.

In another embodiment, paired conducting members may be disposed surrounding at least a portion of the shaft. The sectional magnetic encoding takes advantage of the asymmetrical skin effect and the fact that a current always takes the path of least impedance. The impedance is dominated by inductance if the frequency of the current is high enough. In the case of a short current pulse the return current flowing in the shaft will be more localized than in the case of a longer pulse, enabling polarized and well defined/narrow magnetic patterns. This effect is used to magnetize sections of a shaft with more localized channels that lead to faster changes in the magnetic field during sensing. In embodiments where the encoded sections are created in axial direction or diagonally, torque signals with sufficient time resolution are achieved by applying multiple encoded sections and sufficiently high nominal speed of the shaft 16. It should be noted herein that additional details about the sectional magnetic encoding of the shaft is not discussed in greater detail. U.S. patent application Ser. No. 12/134,689 titled "DIRECT SHAFT POWER MEASUREMENTS FOR ROTATING MACHINERY" is incorporated herein by reference.

Figure 4:
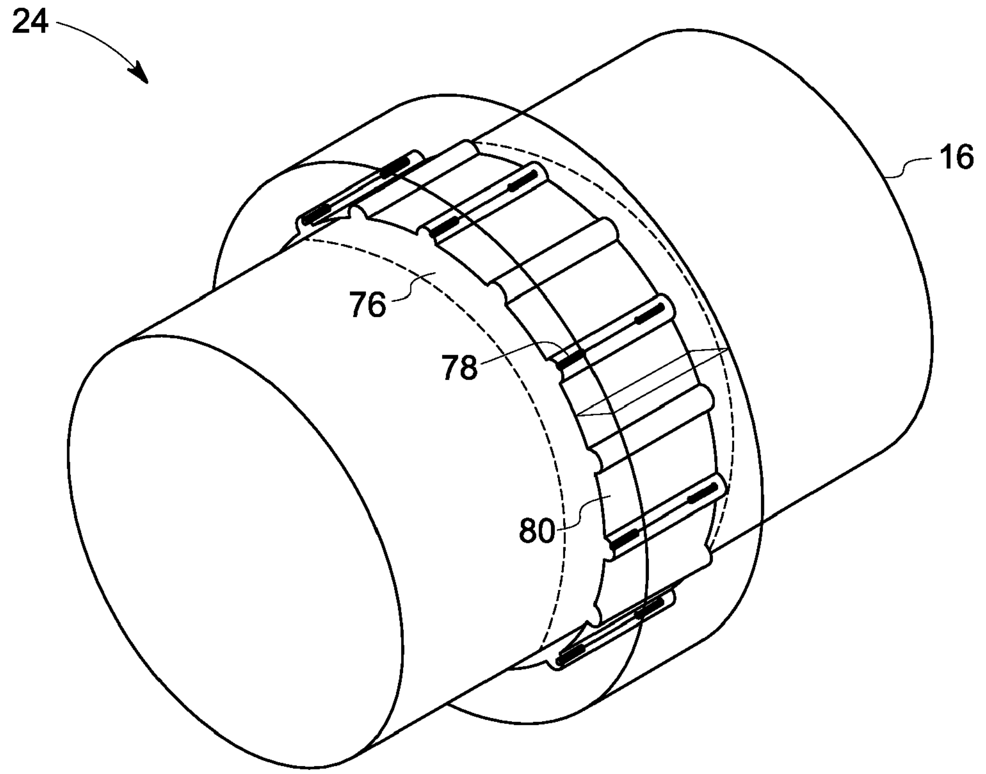
FIG. 4 is a diagrammatical view of a magnetostrictive sensor having a plurality of sensor coils disposed within a metallic tube in accordance with an exemplary embodiment of the present invention.

Referring to FIG. 4, a magnetostrictive torque sensor 24 is illustrated disposed around the crankshaft 16. In the illustrated embodiment, a magnetic encoding region of the shaft 16 is illustrated by the reference numeral 76. A plurality of sensor coils 78 are disposed around the magnetic encoded region 76 of the shaft 16. The sensor coils 78 are adapted to detect a magnetic field emitted by the encoded region 76 of the shaft 16. This sensor design requires shielding of the magnetic field sensor coils 78 against external electromagnetic disturbances. In the illustrated embodiment, the magnetic field sensor coils 78 are positioned within a metallic tube 80. In embodiments involving lateral movements of the shaft, multiple magnetic field sensor coil pairs 78 must be positioned around the shaft 16. The metallic tube 80 is used to protect the sensor coils 78 from external electromagnetic fields so as to improve measurement accuracy.

Figure 5:
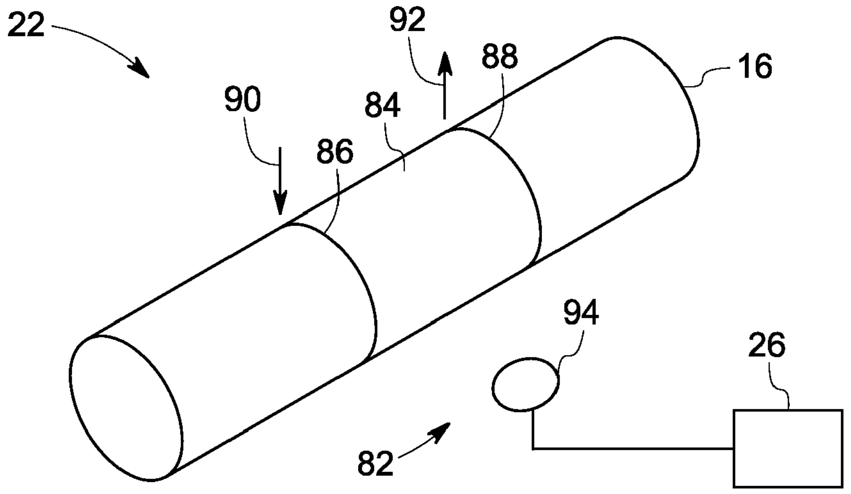
FIG. 5 is a diagrammatical view of a magnetostrictive sensor configured to provide partial encoding of a shaft and detect shaft torque in accordance with an exemplary embodiment of the present invention.

Referring to FIG. 5, a combustion control system 22 having a magnetostrictive torque sensor 82 disposed around the shaft 16 is illustrated. In the illustrated embodiment, the magnetostrictive torque sensor design employs total shaft encoding and the magnetization occurs by current flowing in the axial direction of the shaft 16. A magnetic encoded region of the shaft 16 is indicated by the reference numeral 84. A first location is indicated by reference numeral 86 and indicates one end of the encoded region 84 and the second location is indicated by reference numeral 88, which indicates another end of the encoded region, or the region to be magnetically encoded 84. Arrows 90 and 92 indicate the application of a current pulse. A first current pulse is applied to the shaft 16 at an outer region adjacent or close to the first location 86. As indicated with arrow 92, the current pulse is discharged from the shaft 16 close or adjacent or at the second location 88 preferably at a plurality or locations along the end of the region 4 to be encoded. A second current pulse with other polarity may be applied to increase the torque sensor performance by creating two magnetized domains in region 84 with well-defined domain boundaries. Reference numeral 94 indicates a magnetic field sensor element, for example, a hall effect sensor connected to the control unit 26. The control unit 26 may be adapted to further process a signal output by the sensor element 94 so as to output a signal corresponding to a torque applied to the shaft 16. The sensor element 94 is adapted to detect a magnetic field emitted by the encoded region 84 of the shaft 16.

If there is no stress or force applied to the shaft 16, there is no field detected or a constant field is detected by the sensor element 94. However, in case a stress or a force is applied to the shaft 16, there is a variation in the magnetic field emitted by the encoded region such that an increase of a magnetic field is detected by the sensor element 94.

In another embodiment, the current is introduced into the shaft 16 at or adjacent to location 88 and is discharged or taken from the shaft 16 at or adjacent to the location 86. In another embodiment, a plurality of current pulses may be introduced adjacent to first location 86 and plurality of current pulses may be discharged adjacent to second location 88 and vice versa. In yet another embodiment, pinning regions (not shown) may be provided adjacent to locations 86 and 88. These pinning regions may be provided for avoiding a fraying of the encoded region 84. Additional details of the illustrated embodiment are not described. U.S. Pat. No. 7,243,557 titled "torque sensor" is incorporated herein by reference.

Figure 6:
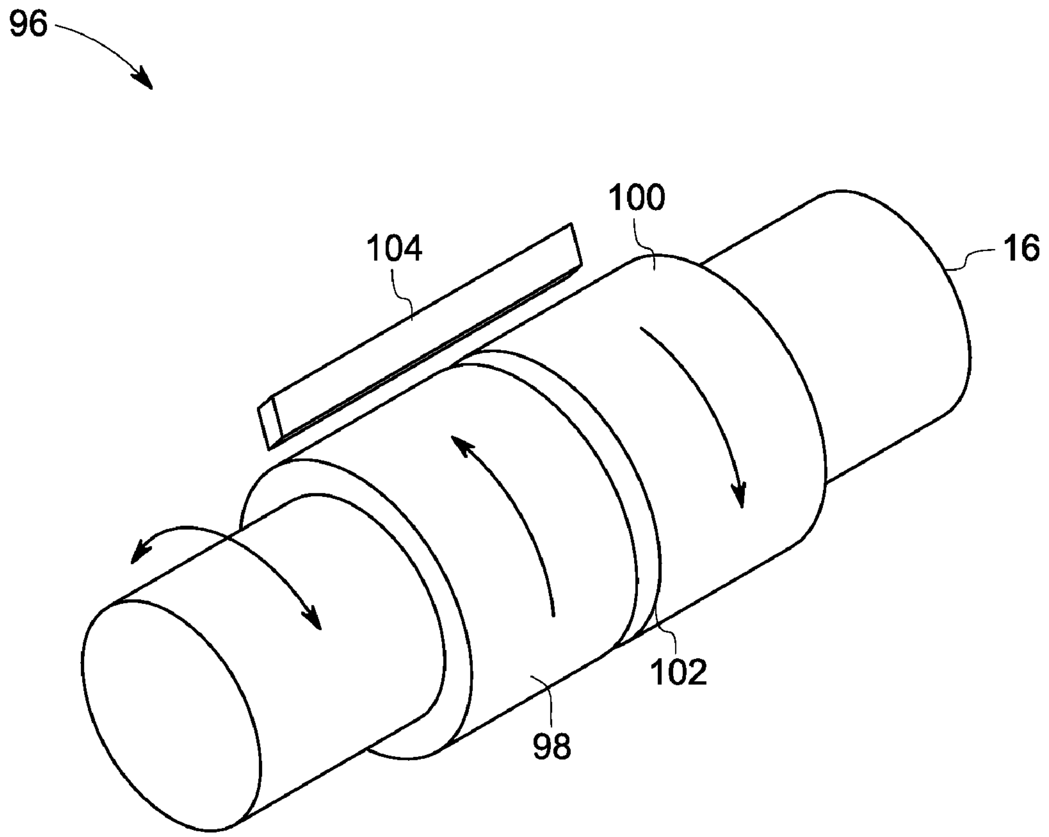
FIG. 6 is a diagrammatical view of a magnetoelastic torque sensor configured to detect shaft torque in accordance with an exemplary embodiment of the present invention.

Referring to FIG. 6, a magneto elastic sensor 96 disposed around the shaft 16 is illustrated. A plurality of polarized rings 98, 100 are disposed around the shaft 16 such that the rings 98, 100 magnetically divide opposing polarization regions. In the illustrated embodiment, a domain wall 102 separates the polarized rings 98, 100. A magnetic field sensor element 104 is located proximate the rings 98, 100 and senses the magnetic flux density. An output from the sensor element 104 are processed such that the stresses in the rings 98, 100 correspond to the torque imparted upon the shaft 16. For additional details, U.S. patent application Ser. No. 12/134,689 is incorporated herein by reference.

As discussed with reference to embodiments illustrated in FIGS. 1-6, it is reiterated that only a single magnetic torque sensor is used to achieve real-time measurement feedback and high time resolution signals from the combustion event in each engine cylinder. The control system is used for individual cylinder diagnostics and closed loop control of combustion in large reciprocating engines.

Only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A combustion control system for a combustion engine system, the combustion control system comprising:

a magnetic torque sensor disposed between an engine and a load; wherein the magnetic torque sensor is configured to directly measure engine torque and output a torque signal indicative of the engine torque;

a control unit communicatively coupled to the magnetic torque sensor; wherein the control unit comprises a data acquisition unit configured to receive the torque signal and output one or more signals corresponding to the one or more combustion parameters based on the torque signal; wherein the data acquisition unit comprises a high pass knock filter configured to receive the torque signal and output a knock signal corresponding to an engine cylinder among a plurality of engine cylinders, wherein the control unit is configured to control one or more manipulating parameters of the engine based on the one or more combustion parameters so as to control combustion in the engine.

2. The combustion control system of claim 1; wherein the magnetic torque sensor comprises a magneto elastic sensor.

3. The combustion control system of claim 1; wherein the magnetic torque sensor comprises a magnetostrictive sensor.

4. The combustion control system of claim 1; wherein the one or more combustion parameters comprises engine cylinder knock, misfired cylinder, combustion timing; torque oscillations, or combinations thereof.

5. The combustion control system of claim 1, wherein the control unit comprises a controller configured to receive one or more signals corresponding to the one or more combustion parameters and control one or more manipulating parameters so as to control combustion in the engine and power output of the engine to a power output set point.

6. The combustion control system of claim 1; wherein the manipulating parameters comprises a throttle valve position, boost pressure, air-fuel ratio, fuel ignition timing, fuel injection timing, fuel amount; exhaust gas recirculation, or combinations thereof.

7. A combustion engine system; comprising:

an engine comprising a plurality of engine cylinders;

a load coupled to the engine via a crankshaft;

a magnetic torque sensor disposed between the engine and the load; wherein the magnetic torque sensor is configured to directly measure engine torque and output a torque signal indicative of the engine torque;

a control unit communicatively coupled to the magnetic torque sensor; wherein the control unit comprises a data acquisition unit configured to receive the torque signal and output one or more signals corresponding to the one or more combustion parameters based on the torque signal; wherein the data acquisition unit comprises a high pass knock filter configured to receive the torque signal and output a knock signal corresponding to an engine cylinder among the plurality of engine cylinders; wherein the control unit is configured to control one or more manipulating parameters of the engine based on the one or more combustion parameters so as to control combustion in each cylinder of the engine.

8. The system of claim 7; wherein the engine comprises a gas engine.

9. The system of claim 7; wherein the magnetic torque sensor is disposed around the crankshaft.

10. The system of claim 7; wherein the magnetic torque sensor comprises a magneto elastic sensor.

11. The system of claim 7; wherein the magnetic torque sensor comprises a magnetostrictive sensor.

12. The system of claim 7; wherein the one or more combustion parameters comprises engine cylinder knock, misfired cylinder, combustion timing; torque oscillations, or combinations thereof.

13. The system of claim 7; wherein the data acquisition unit is configured to receive the torque signal and output a signal indicative of variation in cylinder parameters among the plurality of engine cylinders.

14. The system of claim 7, wherein the control unit comprises a controller configured to receive one or more signals corresponding to the one or more combustion parameters and control one or more manipulating parameters so as to control combustion in the engine.

15. The system of claim 7; wherein the manipulating parameters comprises a throttle valve position, boost pressure, air-fuel ratio, fuel ignition timing, fuel injection timing, fuel amount; exhaust gas recirculation, or combinations thereof.

16. A combustion engine system; comprising:

an engine comprising a plurality of engine cylinders;

a load coupled to the engine via a crankshaft;

a contact less magnetostrictive torque sensor disposed around the crankshaft; wherein the magnetostrictive torque sensor is configured to directly measure engine torque and output a torque signal indicative of the engine torque;

a control unit communicatively coupled to the magnetostrictive torque sensor; wherein the control unit comprises a data acquisition unit configured to receive the torque signal and output one or more signals corresponding to the one or more combustion parameters based on the torque signal; wherein the data acquisition unit comprises a torque slope estimator configured to receive the torque signal and output a signal indicative of misfire corresponding to an engine cylinder among the plurality of engine cylinders; wherein the control unit is configured to control one or more manipulating parameters of the engine based on the one or more combustion parameters so as to control combustion in each cylinder of the engine.

17. The system of claim 16; wherein the magnetostrictive torque sensor provides a magnetic encoding around the entire crankshaft.

18. The system of claim 16; wherein the magnetostrictive torque sensor provides a magnetic encoding partially around the crankshaft.

19. The system of claim 18; wherein the magnetostrictive torque sensor comprises a plurality of sensing coils disposed in a metallic casing configured to protect the sensing coils from electromagnetic disturbances so as to obtain torque measurement that is independent of lateral movements of the crankshaft.

20. The system of claim 16; wherein the engine comprises a gas engine.

21. A combustion engine system; comprising:

an engine comprising a plurality of engine cylinders;

a load coupled to the engine via a crankshaft;

a magnetic torque sensor disposed between the engine and the load; wherein the magnetic torque sensor is configured to directly measure engine torque and output a torque signal indicative of the engine torque;

a control unit communicatively coupled to the magnetic torque sensor; wherein the control unit comprises a data acquisition unit configured to receive the torque signal and output one or more signals corresponding to the one or more combustion parameters based on the torque signal; wherein the data acquisition unit comprises a heat release estimator configured to receive the torque signal and output a signal indicative of combustion timing corresponding to an engine cylinder among the plurality of engine cylinders; wherein the control unit is configured to control one or more manipulating parameters of the engine based on the one or more combustion parameters so as to control combustion in each cylinder of the engine.

* * * * *